(12) United States Patent
Nagayama et al.

(10) Patent No.: US 9,238,213 B2
(45) Date of Patent: Jan. 19, 2016

(54) OZONE GENERATOR

(75) Inventors: Takahisa Nagayama, Chiyoda-ku (JP);
Hajime Nakatani, Chiyoda-ku (JP);
Yoshiaki Odai, Chiyoda-ku (JP);
Noboru Wada, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/372,460

(22) PCT Filed: Apr. 23, 2012

(86) PCT No.: PCT/JP2012/060854
§ 371 (c)(1),
(2), (4) Date: Jul. 16, 2014

(87) PCT Pub. No.: WO2013/160986
PCT Pub. Date: Oct. 31, 2013

(65) Prior Publication Data
US 2014/0356244 A1 Dec. 4, 2014

(51) Int. Cl.
*B01J 19/08* (2006.01)
*C01B 13/11* (2006.01)

(52) U.S. Cl.
CPC ............. *B01J 19/088* (2013.01); *C01B 13/11* (2013.01); *B01J 2219/0807* (2013.01); *C01B 2201/12* (2013.01); *C01B 2201/64* (2013.01); *C01B 2201/76* (2013.01)

(58) Field of Classification Search
CPC C01B 13/11; C01B 2201/12; C01B 2201/76; C01B 2201/64; C01B 2201/14; C01B 2201/22; C01B 2201/32; C01B 2201/24; B01J 19/088; B01J 2219/0807
See application file for complete search history.

(56) References Cited

U.S. PATENT DOCUMENTS 4,232,229 A * 11/1980 Tanaka et al. .............. 422/186.2
2010/0296981 A1 11/2010 Takauchi et al.

FOREIGN PATENT DOCUMENTS

JP 2000-203808 A 7/2000
JP 2001-26404 A 1/2001
(Continued)

OTHER PUBLICATIONS

International Search Report (PCT/ISA/210) mailed on May 22, 2012, by the Japanese Patent Office as the International Searching Authority for International Application No. PCT/JP2012/060854.
Office Action issued on Aug. 4, 2015, by the Japanese Patent Office in corresponding Japanese Patent Application No. 2014-512045 and an English translation of the Office Action. (6 pages).

*Primary Examiner* — Xiuyu Tai
(74) *Attorney, Agent, or Firm* — Buchanan Ingersoll & Rooney PC

(57) ABSTRACT

An ozone generating apparatus which is provided with a discharge suppressing member formed of a metal plate and covering an outer circumferential surface of a portion of a dielectric tube facing to a tube sheet, the discharge suppressing member being electrically in contact with a metal tube or the tube sheet, wherein the discharge suppressing member is formed by curling the metal plate longer than a circumferential length of the dielectric tube into a circular shape so as to have an overlapping portion, and by joining together, in the overlapping portion, a part of the metal plate placed outside and a part of the metal plate placed inside, at a near-end portion of the metal plate placed outside in the overlapping portion, and wherein the discharge suppressing member has, on the part of the metal plate placed outside in the overlapping portion, a spring portion.

5 Claims, 12 Drawing Sheets

(56) References Cited

FOREIGN PATENT DOCUMENTS

| | | |
|---|---|---|
| JP | 2001-151503 A | 6/2001 |
| JP | 2008-013404 A | 1/2008 |
| JP | 2010-269950 A | 12/2010 |
| JP | 2012-41267 A | 3/2012 |

\* cited by examiner

OZONE GENERATOR

TECHNICAL FIELD

The present invention relates to an ozone generating apparatus that generates ozone from an oxygen-containing source gas by silent discharge.

BACKGROUND ART

Heretofore, among ozone generating apparatuses used in a water treatment and the like, many of them have utilized silent discharge. A basic configuration of the ozone generating apparatuses that utilize silent discharge, comprises such a structure in which a cylindrical dielectric tube with a metal film formed on the inner surface thereof, is inserted in a cylindrical metal tube so that a predetermined gap is given between the inner wall of the metal tube and the outer wall of the dielectric tube. By flowing an oxygen-containing source gas (air, oxygen gas, etc.) in the gap, and by applying a high-voltage AC voltage between the metal tube and the metal film on the inner surface of the dielectric tube to thereby generate an AC field in the gap through the dielectric material of the dielectric tube, the source gas is discharged and oxygen in the source gas is ozonized, so that ozone is produced.

Recently, for such an ozone generating apparatus used in a treatment of huge volume of water, because of increasing treatment volume, it is required to enhance its treatment capacity without size increase. In order to fulfill such a requirement, it is necessary to increase an amount of ozone produced per unit size of the apparatus, and for that reason, it is necessary to increase a discharge power density. However, with the increase in the discharge power density, heat-related problems are also increased. In particular, there is a problem that cooling unevenness emerges near an end portion of the metal tube. In order to suppress this, such a measure has been taken that a discharge suppressing member is provided in a portion of the gap at the end portion (for example, Patent Document 1).

Heat generated by the discharge is taken away by cooling water that circulates outside the metal tube, so as to inhibit the dielectric tube from becoming too high temperature. If the dielectric tube becomes too high temperature, since its breakdown voltage decreases, it no longer withstand the applied high voltage and will be dielectrically broken down, resulting in damage of the apparatus. Meanwhile, in a case of no discharge suppressing member, because the discharge occurs space between the dielectric tube and the metal tube whereas no cooling water circulates in a tube sheet portion, a temperature near the tube sheet portion becomes highest, so that a temperature of the dielectric tube in contact therewith becomes highest at a portion facing to the tube sheet portion. Feedable power to the apparatus is determined so that the highest temperature of the dielectric tube equal to or less than a reference temperature. Thus, if the temperature of the dielectric tube at the portion facing to the tube sheet portion can be decreased, feedable power becomes larger, so that an amount of ozone produced by the apparatus can be increased. Accordingly, when the discharge suppressing member is placed at the tube sheet portion to thereby suppress the discharge thereat, such an effect vided that the temperature of this portion is decreased, so that the average power can be made larger to thereby increase the amount of ozone produced by the apparatus.

CITATION LIST

Patent Document

Patent Document 1: Japanese Patent Application Laid-open No. 2010-269950

SUMMARY OF THE INVENTION

Problems to be Solved by the Invention

For the discharge suppressing member, a highly ozone-resistant material is desirable. That is, when it is an insulating material, a glass fiber or a fluorinated resin is desirable, and when it is a conductive material (metal), a SUS or the like is desirably used. Meanwhile, in order to suppress the discharge, it is necessary that the discharge gap be made several tens µm or less. Thus, in the case of using an insulating material, it is necessary to fill the insulating material in the gap; however, when the insulating material is filled therein, it becomes unable to flow the source gas in the gap. Accordingly, it is not allowed to completely fill the gap, causing a problem that the discharge is not suppressed sufficiently.

In contrast, in the case of using a metal as the material of the discharge suppressing member, the discharge suppressing member and the metal tube become at the same potential due to their electrical connection, so that a discharge voltage is applied between the discharge suppressing member and the outer wall of the dielectric tube. Thus, in order to suppress the discharge, it is necessary that the gap therebetween be made several tens µm or less. Generally, the dielectric tube is formed of an inexpensive glass tube in many cases, so that an accuracy of its outer diameter is often around 100 µm. Thus, when the discharge suppressing member is formed of a rigid body, it will not conform to the outer surface of the glass tube, thereby forming a gap. In order to avoid the gap, when the discharge suppressing member is prepared by a metal foil such as a SUS foil and a spring member is inserted between the metal tube and the discharge suppressing member, there is a problem that a portion held by the spring member is made contact with the surface of the glass tube; however, at the not-held portion, a gap will be formed between the discharge suppressing member and the glass tube, so that the discharge occurs.

This invention has been made to solve the problems as described above, and an object thereof is to provide an ozone generating apparatus in which a gap is hardly formed between the discharge suppressing member and the glass tube.

Means for Solving the Problems

An ozone generating apparatus of this invention comprises: a hermetically sealed vessel; two tube sheets each comprising a conductive metal plate having a hole formed therein, which are provided in the hermetically sealed vessel so as to partition its inside into three spaces; a metal tube provided so as to connect the holes of the two tube sheets; a dielectric tube with a metal electrode formed inside thereof, which is held inside the metal tube so that a predetermined gap is given between an outer wall of the dielectric tube and the inner wall of the metal tube; and an AC power supply for applying an AC voltage between the metal tube and the metal electrode; said ozone generating apparatus being configured to flow an oxygen-containing source gas from either one of spaces placed at both end sides among the three spaces to the other one of the spaces placed at both end sides, through at least the gap; to generate ozone by discharging the source gas flowing through the gap while placing the metal tube and the tube sheets at ground potential and placing the metal electrode inside the dielectric tube at high potential; and to cause cooling by flowing cooling water in a space partitioned by the two tube sheets, an outer wall of the metal tube, and an inner wall of the hermetically sealed vessel; and said ozone generating apparatus further comprising a discharge suppressing member formed of a metal plate and covering an outer circumferential surface of a portion of the dielectric tube facing to at least one tube sheet of the tube sheets, said discharge suppressing member being electrically in contact with the metal tube or the tube sheet;

wherein the discharge suppressing member is formed by curling the metal plate longer than an outer circumferential length of the dielectric tube into a circular shape so as to have an overlapping portion, and by joining together, in the overlapping portion, a part of the metal plate placed outside and a part of the metal plate placed inside, at a near-end portion of the metal plate placed outside in the overlapping portion; said discharge suppressing member having on the part of the metal plate placed outside in the overlapping portion, a spring portion stretched in a circumferential direction of the dielectric tube.

Effect of the Invention

According to this invention, because of the function of the spring portion, it is possible to provide an ozone generating apparatus in which a gap is hardly formed between the discharge suppressing member formed of a metal plate and the glass tube.

MODES FOR CARRYING OUT THE INVENTION

Embodiment 1

Figure 1:
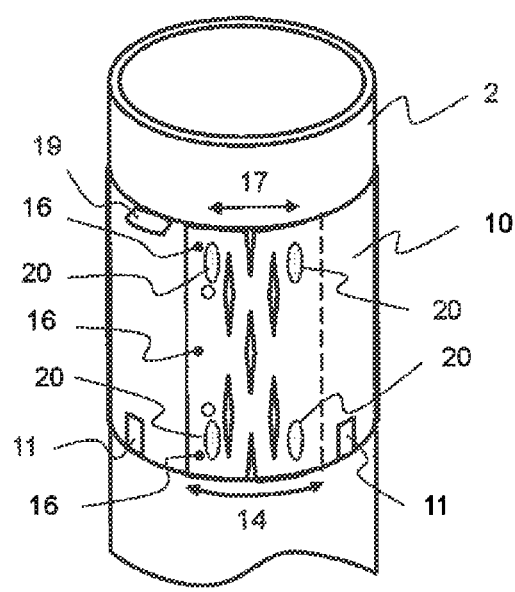
FIG. 1 is an outline view partly showing a glass tube attached with a discharge suppressing member of an ozone generating apparatus according to Embodiment 1 of the invention.
Figure 2:
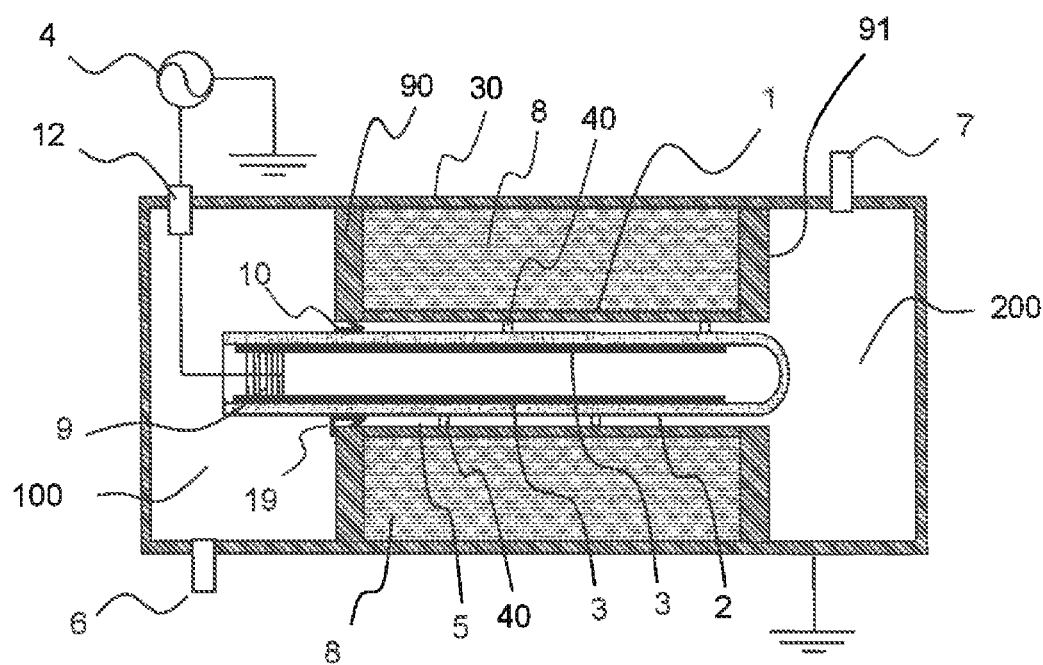
FIG. 2 is a schematic side sectional view showing an ozone generating apparatus of the invention.
Figure 3:
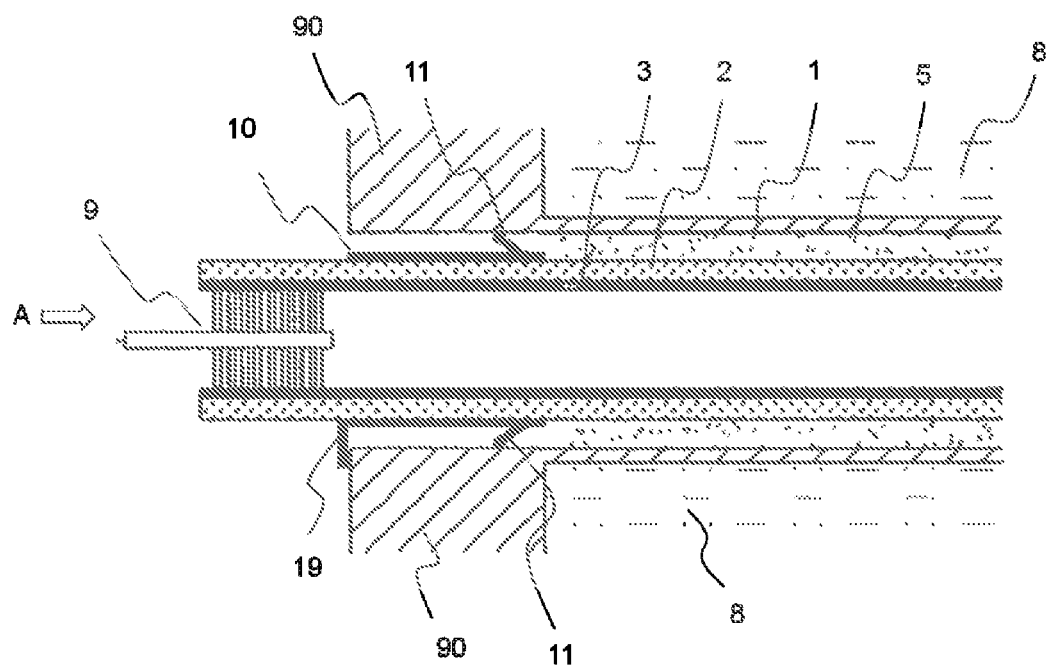
FIG. 3 is an enlarged side sectional view showing a main part of the invention in an ozone generating apparatus of the invention.

Hereinafter, Embodiment 1 of the invention will be described based on FIG. 1 to FIG. 7, FIG. 2 is a schematic side sectional view showing an ozone generating apparatus of the invention, and FIG. 3 is an enlarged side sectional view showing a main part of the ozone generating apparatus of the invention. The ozone generating apparatus is configured with a hermetically sealed vessel 30 of a large cylindrical shape such that an oxygen-containing source gas, such as oxygen or an air, is introduced therein through a gas inlet 6, and an ozonized gas ozonized therein is taken out through a gas outlet 7. The hermetically sealed vessel 30 is partitioned by a first tube sheet 90 and a second tube sheet 91 to provide a gas-inlet side space 100 and a gas-outlet side space 200. There is provided a metal tube 1 which is fixedly connected to a hole formed in the first tube sheet 90 and a hole formed in the second tube sheet 91 so as to keep a hermetic tightness. The metal tube 1 is cylindrically shaped with a circular cross-sectional shape, and serves as a ground electrode tube. Further, the two tube sheets 90 and 91 are each formed of a conductive metal plate, and are places at the same electric potential of the metal tube 1. Cooling water 8 is filled in a space partitioned by the first tube sheet 90, the second tube sheet 91, an outer wall of the metal tube 1 and an inner wall of the hermetically sealed vessel 30, and the cooling water 8 flows therein.

In the metal tube 1, a dielectric tube 2 that is, on its inner wall, provided with a conductive film 3 given as a metal electrode, is placed coaxially with the metal tube 1. Here, as the dielectric tube 2, a glass tube 2 is used. A gap forming a discharge space 5 is provided between the inner wall of the metal tube 1 and the outer wall of the glass tube 2. In order to make the gap uniform in dimension, spacers 40 are provided at appropriate intervals so as not to disturb a flow of the gas. To the conductive film 3, an AC voltage is fed from an AC power supply 4 through a feeder brush 9. A surface of the glass tube 2 at a place facing to the first tube sheet 90, is covered with a discharge suppressing member 10 formed of a thin metal plate having a thickness of about 10 to 100 µm. In the discharge space 5, an oxygen-containing source gas, such as oxygen or an air, is caused to flow from the gas-inlet side space 100 toward the gas-outlet side space 200. Because of an AC high voltage applied between the conductive film 3, i.e.

the metal electrode and the metal tube 1, the oxygen-containing gas flowing in the discharge space 5 is discharged and oxygen in the gas is ozonized, so that the ozonized gas is taken out through the gas outlet 7. The cooling water 8 flows on the exterior of the metal tube 1, so that the glass tube 2 is also cooled through the metal tube 1 and the discharge space 5. In FIG. 2, only a single discharge tube constituted by the metal tube 1 and the glass tube 2 in combination, is shown schematically; however, in the ozone generating apparatuses applied to a water treatment, in many cases, multiple discharge tubes are provided depending on an amount of ozone to be produced.

Since portions of the glass tube 2 facing to the first tube sheet 90 and the second tube sheet 91 are farther from the cooling water 8, these portion of the glass tube are less likely getting cooled. On the inner side of the glass tube 2 in its portion facing to the first tube sheet 90 placed upstream, the conductive film 3 is being formed, and the feeder brush 9 is inserted so as to be in contact with the conductive film 3. Since the portion of the glass tube 2 facing to the first tube sheet 90 as farther from the cooling water 8, the portion of the glass tube 2 facing to the first tube sheet 90 placed upstream, less likely getting cooled. Thus, the discharge suppressing member 10 is provided so as not to cause the discharge in a gap at the portion facing to the first tube sheet 90. If the discharge suppressing member 10 is not provided, the discharge occurs in the gap at the portion facing to the first tube sheet 90, so that heat due to the discharge is brought to the portion of the glass tube 2. On the inner wall of the glass tube 2 in its portion facing to the second tube sheet 91, placed downstream, the conductive film 3 is not formed. Thus, no electric field is generated between the second tube sheet 91 and the glass tube 2, so that no discharge occurs even if the discharge suppressing member 10 is not provided, and therefore, the glass tube 2 is not heated in that portion.

The discharge suppressing member 10 is formed of a metal plate, provided with contact portions 11, and placed at ground potential because of the contact portions being in contact with a portion of the first tube sheet 90 facing to the discharge suppressing member 10. The contact portions 11 may be provided so as to be in contact with the metal tube 1 instead of the first tube sheet 90. Since the discharge suppressing member 10 is placed at ground potential, no electric field is generated in a part of the gap where the discharge suppressing member 10 is placed, and also no discharge occurs therein. Thus, no power is fed to that part and thus heat due to discharge is not brought to the portion of the glass tube 2 facing to the first tube sheet 90, so that temperature rise in the portion of the glass tube is suppressed. In order to sufficiently suppress the temperature rise of the portion of the glass tube 2 facing to the first tube sheet 90, it is desirable to use the discharge suppressing member 10 having a width that is comparable with the thickness of the tube sheet.

Figure 4:
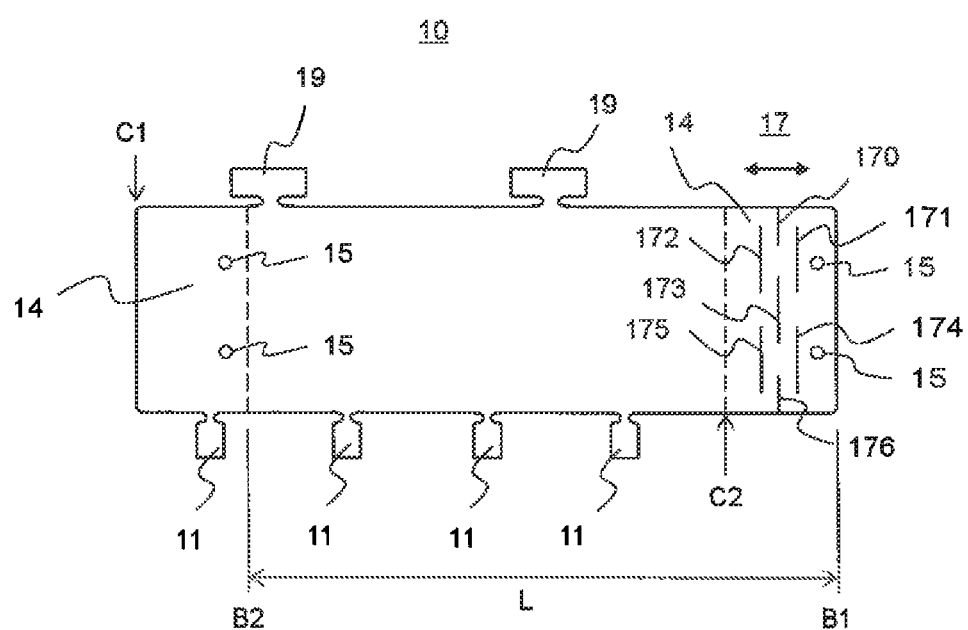
FIG. 4 is a developmental view showing the discharge suppressing member of the ozone generating apparatus according to Embodiment 1 of the invention.
Figure 5:
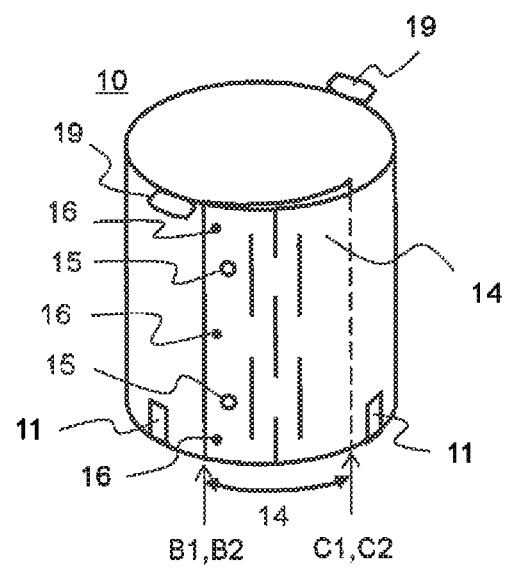
FIG. 5 an outline view showing the discharge suppressing member before attached onto the glass tube, of the ozone generating apparatus according to Embodiment 1 of the invention.

Shown in FIG. 1 is an outline view of the discharge suppressing member 10 attached onto the glass tube 2 of the ozone generating apparatus according to Embodiment 1 of the invention. Further, shown in FIG. 4 is a developmental view of the discharge suppressing member 10, and in FIG. 5 is an outline view of the discharge suppressing member 10 before attached onto the glass tube 2. First, as shown in the developmental view in FIG. 4, a cut sheet is prepared by etching from a metal plate having a thickness of several tens μm. In the metal plate, slits 170 to 176 are formed. A spring portion 17 is constituted by these slits 170 to 176. The slits are so arranged that their longitudinal directions are perpendicular to the circumferential direction of the glass tube when assembled. The contact portions 11, marker tabs 19 and positioning pin holes 15, etc., are also formed by etching. However, the marker tabs 19 and the positioning pin holes 15 are not essentially required.

As shown in FIG. 4, the cut sheet prepared by etching is formed into a circular shape by curling it so that an end portion B1 overlaps a portion B2 and the other end portion C1 overlaps a portion C2, followed by making joint at around an edge of an overlapping portion 14 by a joining means such as spot welds 16, in this case, the joint is made with a length L between B1 and B2 i.e. a circumferential length being set slightly shorter than the outer diameter of the glass tube 2. Although the formation of the positioning pin holes 15 is not essentially required, the formation of the positioning pin holes 15 makes it easy to accurately adjust the circumferential length. When the thus-formed discharge suppressing member 10 is attached onto the glass tube 2, the spring portion 17 formed by the slits is stretched in the circumferential direction so as to conform to the outer diameter of the glass tube 2, to thereby exert a spring effect.

When there is a gap of 20 to 30 μm or more between the glass tube 2 and the discharge suppressing member 10, the discharge occurs therebetween, so that the glass tube heated, in the discharge suppressing member 10 according to the invention, the overlapping portion 14 having a region indicated by a curved arrow in FIG. 1 is provided. By the spring portion 17 indicated by a linear arrow that is further formed on a portion of the metal plate placed outside in the overlapping portion, the inner diameter is adjusted to be closely attached to the glass tube, so that the discharge suppressing member is closely attached to the glass tube at all of the face other than at a slight space on the periphery of the overlapping portion 14.

The spring force by the spring portion 17 according to Embodiment 1 does not come from a deflection force in the circumferential direction of the glass tube resulted from stretching of the thin metal plate in the circumferential direction, but comes from a deflection due to distortion in the radial direction of the thin metal plate resulted from stretching of the thin metal plate the circumferential direction. At around the spring portion 17, the discharge suppressing member is not closely attached to the underlying surface; however, since a portion of the discharge suppressing member 10 is caused to be overlapped under the spring portion 17 so as to be placed inside, the discharge suppressing member is configured to be closely attached at all of the face. By closely attaching it in such a way, an effect is provided that the discharge suppressing member 10 is enhanced in its effect, so that the feedable power density can be increased by suppressing overheat of the generating tube.

Figure 6:
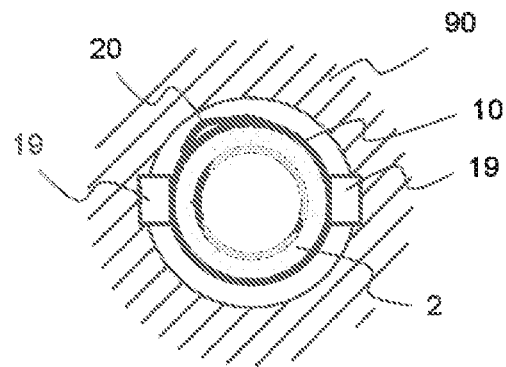
FIG. 6 is a side view of a main part of the ozone generating apparatus according to Embodiment 1 of the invention, viewed in A-direction in FIG. 3.

In FIG. 1, deflection portions 20 that act as springs when being inserted, are indicated by hatching. Further, shown in FIG. 6 is a diagram viewed in A-direction in FIG. 3 of a state in which the glass tube 2 attached with the discharge suppressing member 10 is inserted in the metal tube 1 (in the state, the feeder brush 9 is not inserted). At the time of insertion, in the discharge suppressing member 10 being stretched in the transverse direction by the surface of the glass tube, a part of tension in the transverse direction is changed due to the pattern of the spring portion into a directional force component compressing in the vertical direction. By this force, the discharge suppressing member 10 undergoes deflection in the radial direction, thereby producing a strong tension due to formation of the deflection portions 20. Accordingly, although a little bit of gap in the radial direction is required in order to cause this portions to act as springs, since the in-plane deflections can be utilized, a strong spring force is achieved even if these are compact. Further, since the area where the in-plane deflections occurs is large, the area where the springs can expand or contract is large, thus allowing fitting to the glass tube even if an accuracy of the outer diameter thereof is somewhat poor.

Further, because the slit portions in the spring portion 17 are configured to be overlaid on the inside portion of the metal plate when attached onto the glass tube 2, it is possible to suppress the discharge at the slit portions, thereby further enhancing the discharge suppressing effect.

Figure 7:
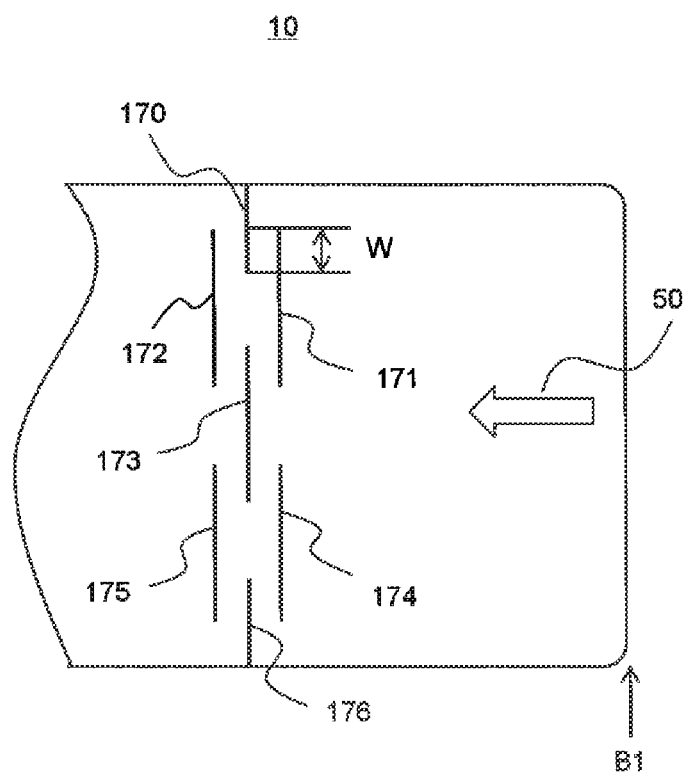
FIG. 7 is an enlarged developmental view showing a spring portion of the discharge suppressing member of the ozone generating apparatus according to Embodiment 1 of the invention.

As described above, by forming the slits 170 to 176 in the metal plate by etching, such an effect is provided that the formed portion is stretched in the circumferential direction and, as a result, the slits portions 170 to 176 and portions therearound constitute the spring portion 17, so that it can be prepared in low cost Here, a configuration for effectively achieving a spring function by slits, will be described by an enlarged view of slit portions shown in FIG. 7. Slits are formed in a direction perpendicular to the circumferential direction of the glass tube 2 when attached thereto, that is, an axial direction of the glass tube. A plurality of slit rows each having plural slits arranged in one row in the axial direction, are formed in the circumferential direction. Further, in the slit rows adjacent to each other, each slit row is formed whose slit has an overlapping portion W with the slit in the other slit row, as viewed in the circumferential direction indicated by an arrow 50. Further, the slits are formed to have other overlapping portions so that the whole range in the axial direction is filled with the slits, as viewed in the circumferential direction indicated by the arrow 50. That is, when all of the slits are projected toward the one end portion B1 of the discharge suppressing member 10, their projections have no gap. By thus forming the slits, the spring portion effectively constituted when a stretching force applied thereto in the circumferential direction.

Figure 8:
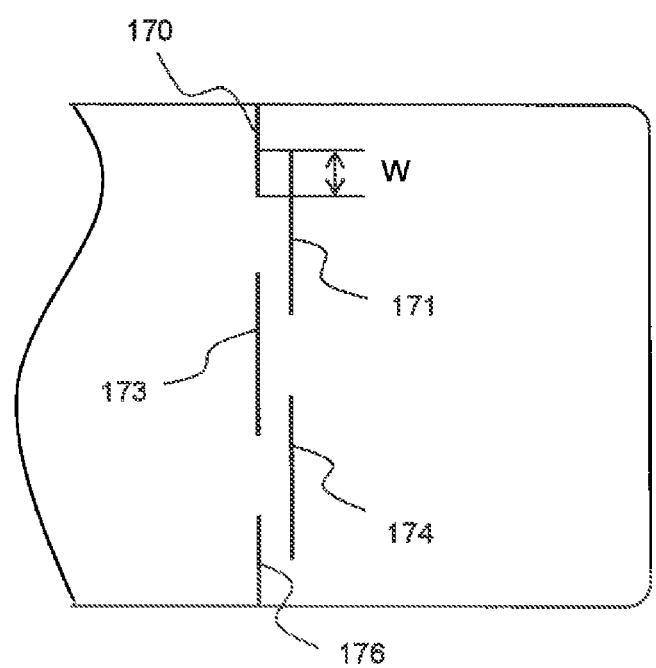
FIG. 8 is an enlarged developmental view showing a spring portion of another discharge suppressing member of the ozone generating apparatus according to Embodiment 1 of the invention.
Figure 9:
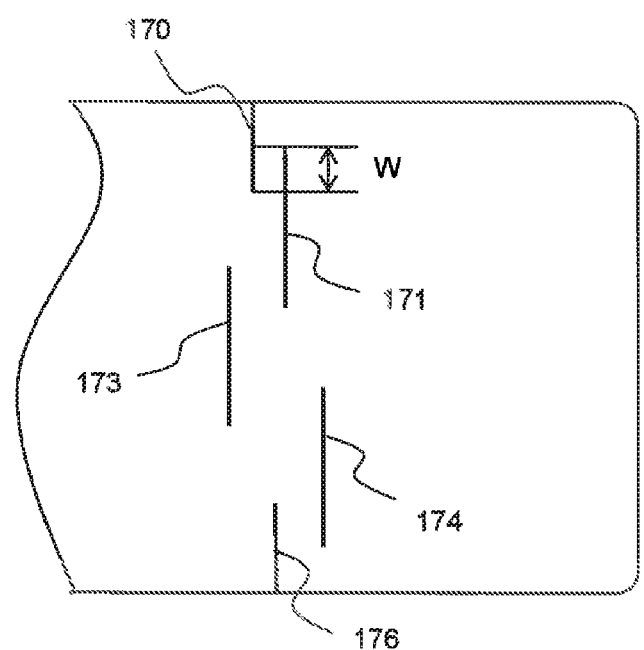
FIG. 9 is an enlarged developmental view showing a spring portion of further another discharge suppressing member of the ozone generating apparatus according to Embodiment 1 of the invention.
Figure 10:
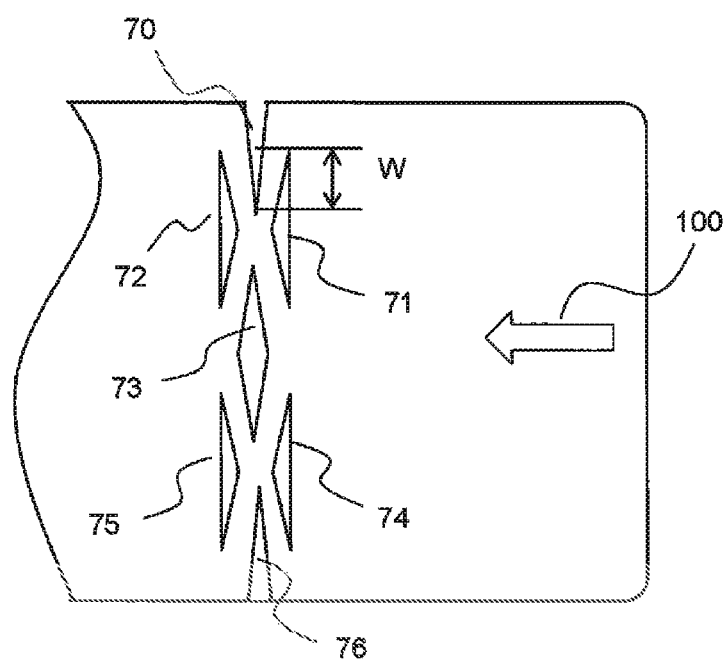
FIG. 10 is an enlarged developmental view showing a spring portion of still another discharge suppressing member of the ozone generating apparatus according to Embodiment 1 of the invention.

As long as such configurations are satisfied that in the slit rows adjacent to each other, each slit row is formed whose slit has the overlapping portion W with the slit in the other slit row as viewed in the circumferential direction indicated by the arrow 50, and that when all of the slits are projected toward the one end portion B1 of the discharge suppressing member 10, their projections have no gap, the slit rows may be two slit rows as shown in FIG. 8. Further, the slits are not necessarily arranged as well-ordered lines in the axial direction, and thus the slits 170 to 176 may be formed in a staggered fashion as shown in FIG. 9. Further, the slits may not be thread-like cuts, and thus the slits 70 to 76 each comprising an elongated gap having a certain degree of area, may be formed as shown in FIG. 10. Furthermore, the thread-like slit and the gap slit with the area may be mixed.

Figure 11:
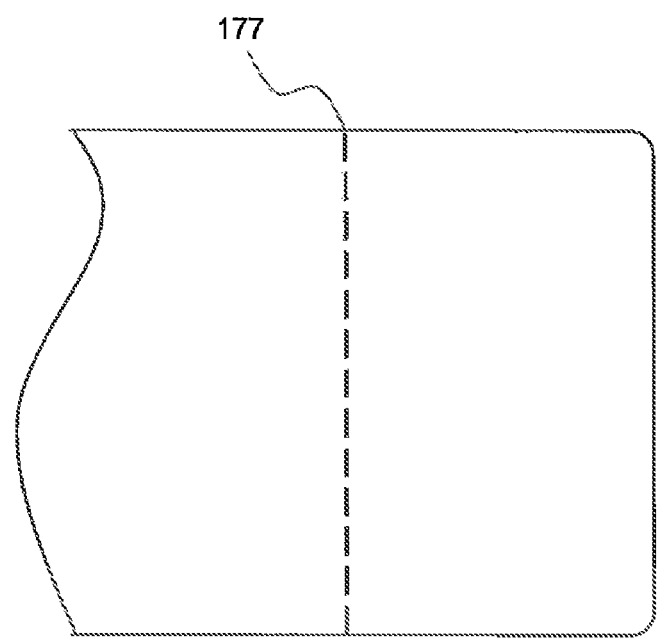
FIG. 11 is an enlarged developmental view showing a spring portion of still further another discharge suppressing member of the ozone generating apparatus according to Embodiment 1 of the invention.

FIG. 11 is an enlarged developmental view showing a in part of still another discharge suppressing member of the ozone generating apparatus according to Embodiment 1 of the invention. For the spring portion, a slit row 177 is formed singly in which many short slits are arranged in one row. A portion of the slit row 177 is stretched in the circumference direction by a very little degree, to thereby exert a spring function. As shown in FIG. 7 to FIG. 10, it is preferable for, the spring portion 17 that the slits or cuts be formed so that when all of the slits are projected toward the one end portion of the discharge suppressing member 10, their projections have no gap; however, even in the case of arranging many slits in one row as shown in FIG. 11, because of being stretched more than the other portions, the portion of the slits serves to function as a spring portion.

The marker tabs 19 are formed to prevent missing of the insertion of the discharge suppressing member 10, and thus the marker tabs 19 are folded outside so that the insertion condition is confirmed at the time of insertion. This situation is shown in FIG. 6. In the state where the marker tabs 19 are not formed, since the thickness of the discharge suppressing member 10 is just several tens μm, visual confirmation in A-direction shown in FIG. 3 is difficult. By forming the marker tabs 19, it becomes possible to visually confirm the attaching condition easily, thereby providing an effect that the inspect time can be reduced. Further, the contact portions 11 are formed to be inserted in a state being folded outside at the time of insertion in order to establish electrical connection between the tube sheet 90 and the discharge suppressing member 10. By machining the contact portions 11 and the discharge suppressing member 10 as a unit such an effect is provided that the assembling time can be reduced.

Embodiment 2

Figure 12:
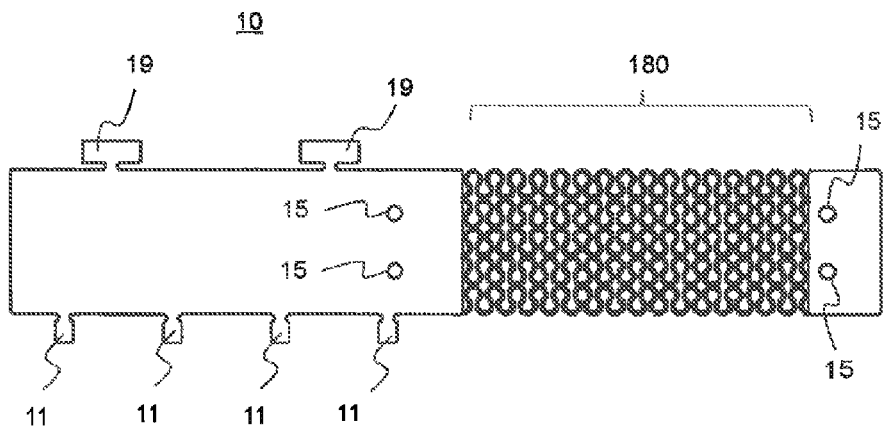
FIG. 12 is a developmental view showing a discharge suppressing member of an ozone generating apparatus according to Embodiment 2 of the invention.
Figure 13:
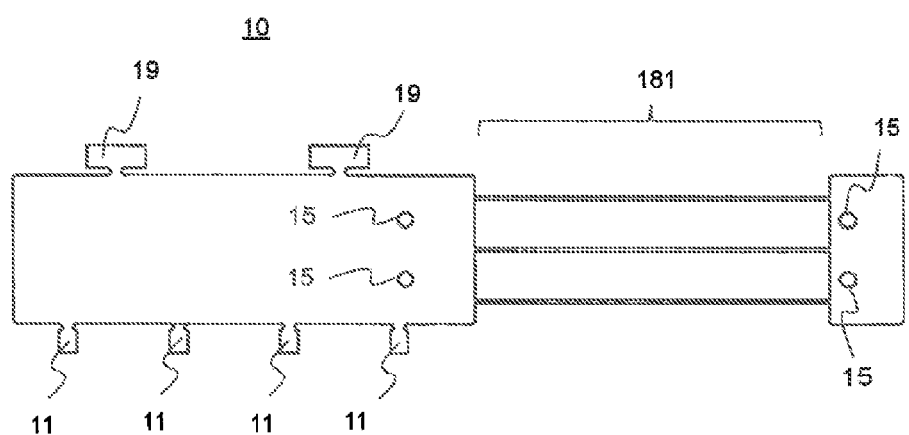
FIG. 13 is a developmental view showing another discharge suppressing member of the ozone generating apparatus according to Embodiment 2 of the invention.

FIG. 12 and FIG. 13 are developmental views each showing a discharge suppressing member of an ozone generating apparatus according to Embodiment 2 of the invention. In the discharge suppressing member 10 shown in FIG. 12, a flat spring portion 180 is provided as the spring portion. The flat spring portion 180 is formed from a metal plate by etching so as to leave a plurality of thin curved portions extending in the circumferential direction. Meanwhile, in the discharge suppressing member 10 shown in FIG. 13, a flat spring portion 181 is provided that utilizes a circumferentially stretchable elasticity of liner portions, instead of the curved portion. In this the spring portion may be configured by forming in the metal plate, a plurality of strip-like portions extending in the circumferential direction of the dielectric tube 2. With these configurations in order to achieve the spring force, the flat spring portion 180 and the flat spring portion 181 are required to have a certain degree of length close to the outer circumferential length of the glass tube 2. However, as different from Embodiment 1, since the circumferential spring force is formed by the flat spring, no deflection portion is formed, so that such an effect is provided that the discharge suppressing member can be arranged even there is no sufficient gap for constituting a spring between the discharge suppressing member 10 and the tube sheet 90.

Embodiment 3

Figure 14:
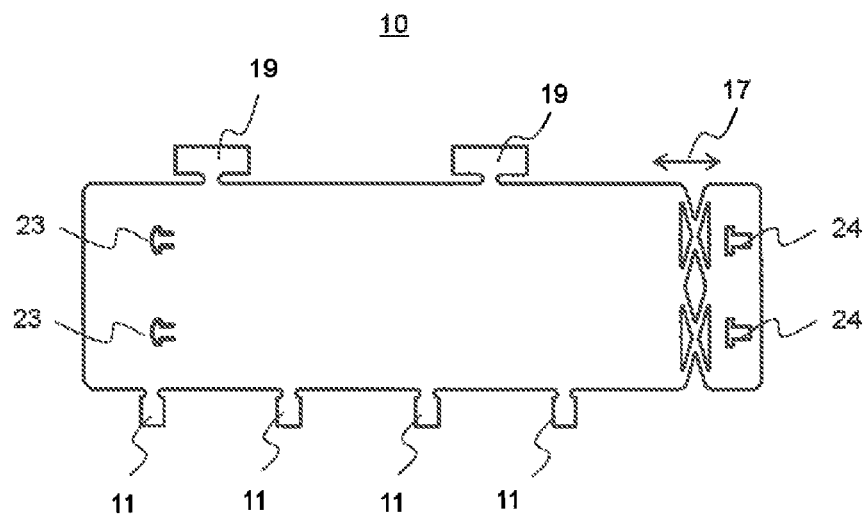
FIG. 14 is a developmental view showing a discharge suppressing member of an ozone generating apparatus according to Embodiment 3 of the invention.
Figure 15:
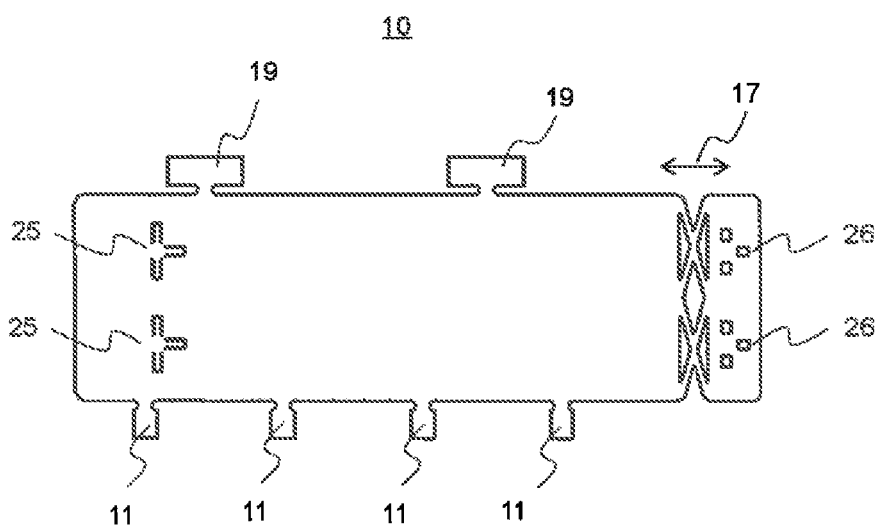
FIG. 15 is a developmental view showing another discharge suppressing member of the ozone generating apparatus according to Embodiment 3 of the invention.

FIG. 14 and FIG. 15 are developmental views each showing a discharge suppressing member of an ozone generating apparatus according to Embodiment 3 of the invention. The discharge suppressing member 10 according to Embodiment 1 is formed into a cylindrical shape by making joint by spot welding as shown in FIG. 5, whereas the discharge suppressing member 10 according to Embodiment 3 is formed into a circular shape by inter-fitting a fitting tag with a fitting hole. In the discharge suppressing member 10 shown in FIG. 14, arrow-shape fitting tags 23 and arrow-shape fitting holes 24 are provided. Meanwhile, in the discharge suppressing member 10 shown in FIG. 15, convex-shape fitting tags 25 and convex-shape fitting holes 26 are provided. According to these means, although a demerit arises in that a gap is formed in their inter-fitting portion, such an effect is provided that it possible to make joint without the spot welding work, allowing the configuration to be achieved in low cost.

Meanwhile, as compared to the arrow-shape fitting tags 23 and the arrow-shape fitting holes 24 in FIG. 14, the convex-shape fitting tags 25 and the convex-shape fitting holes 26 in FIG. 15 are unlikely to be released. In this configuration, such dimensions are applied that, by slightly bending the fitting tag, it is fitted in the fitting hole. Thus, although a special jig required for assembly, it is necessary to bend the tag again for releasing it, so that such an effect provided that the joining stability is enhanced and thus the handling is made easier.

It should be noted that modification of the embodiments and omission in the embodiments may be made as appropriate in the present invention without departing from the scope of the invention.

DESCRIPTION OF REFERENCE NUMERALS AND SIGNS

1: metal tube, 2: dielectric tube (glass tube), 3: conductive film (metal electrode), 4: AC power supply, 5: discharge space, 6: gas inlet, 7: gas outlet, 8: cooling water, 9: feeder brush, 10: discharge suppressing member, 11: contact, 14: overlapping portion, 15: positioning pin hole, 17: spring portion, 19: marker tab, 20: deflection portion, 23: arrow-shape fitting tag, 24: arrow-shape fitting hole, convex-shape fitting tag, 26: convex-shape fitting hole, 70 to 76: slits, 90,91: tube sheets, 170 to 177: slits, 180,181: flat springs.

The invention claimed is:

1. An ozone generating apparatus, comprising:
a hermetically sealed vessel;
two tube sheets each comprising a conductive metal plate having a hole formed therein, which are provided in the hermetically sealed vessel so as to partition its inside into three spaces;
a metal tube provided so as to connect the holes of the two tube sheets;
a dielectric tube with a metal electrode formed inside thereof, which is held inside the metal tube so that a predetermined gap is given between an outer wall of the dielectric tube and the inner wall of the metal tube; and
an AC power supply for applying an AC voltage between the metal tube and the metal electrode;
said ozone generating apparatus being configured to flow an oxygen-containing source gas from either one of spaces placed at both end sides among the three spaces to the other one of the spaces placed at both end sides, through at least the gap; to generate ozone by discharging the source gas flowing through the gap while placing the metal tube and the tube sheets at ground potential and placing the metal electrode inside the dielectric tube at high potential; and to cause cooling by flowing cooling water in a space partitioned by the two tube sheets, an outer wall of the metal tube, and an inner wall of the hermetically sealed vessel; and
said ozone generating apparatus further comprising a discharge suppressing member formed of a metal plate and covering an outer circumferential surface of a portion of the dielectric tube facing to at least one tube sheet of the tube sheets, said discharge suppressing member being electrically in contact with the metal tube or the tube sheet;
wherein the discharge suppressing member is formed by curling the metal plate longer than an outer circumferential length of the dielectric tube into a circular shape so as to have an overlapping portion, and by joining together, in the overlapping portion, a part of the metal plate placed outside and a part of the metal plate placed inside, at a near-end portion of the metal plate placed outside in the overlapping portion; said discharge suppressing member having on the part of the metal plate placed outside in the overlapping portion, a spring portion stretched in a circumferential direction of the dielectric tube;
wherein the spring portion is constituted by a plurality of slits, formed in the metal plate, the plurality of slits extending longitudinally in a direction perpendicular to the circumferential direction of the dielectric tube,
wherein among the plurality of slits, two adjacent slits have an overlapping portion viewed from the circumferential direction of the dielectric tube and two other adjacent slits are spaced apart in the longitudinal direction of the dielectric tube.

2. The ozone generating apparatus of claim 1, wherein the dielectric tube comprises a glass tube.

3. The ozone generating apparatus of claim 1, wherein the plurality of slits have no gap in all of their projections toward the end portion in the circumferential direction of the dielectric tube.

4. The ozone generating apparatus of claim 1, wherein, in the overlapping portion of the metal plate, the part of the metal plate placed outside and the part of the metal plate placed inside are joined by spot welding.

5. The ozone generating apparatus of claim 1, wherein, in the overlapping portion of the metal plate, the part of the metal plate placed outside and the part of the metal plate placed inside are joined by inter-fitting a fitting tag formed on the part of the metal plate placed inside with a fitting hole formed on the part of the metal plate placed outside.

* * * * *